(12) United States Patent
Wang et al.

(10) Patent No.: US 8,056,094 B2
(45) Date of Patent: Nov. 8, 2011

(54) OPTICAL DISC DRIVE

(75) Inventors: Ta-Hsiang Wang, Hsinchu (TW);
Chien-Wei Huang, Hsinchu (TW);
Sheng-Hsiung Chou, Hsinchu (TW);
Wei-Min Tsao, Hsinchu (TW)

(73) Assignee: Lite-On Corporation, Taipei (TW)

( * ) Notice: Subject to any disclaimer, the term of this patent is extended or adjusted under 35 U.S.C. 154(b) by 435 days.

(21) Appl. No.: 12/465,637

(22) Filed: May 13, 2009

(65) Prior Publication Data

US 2010/0251274 A1  Sep. 30, 2010

(30) Foreign Application Priority Data

Mar. 26, 2009 (CN) .......................... 2009 1 0129833

(51) Int. Cl.
*G11B 17/04* (2006.01)
(52) U.S. Cl. ......... 720/620; 720/619; 720/689; 720/713
(58) Field of Classification Search .................. 720/620, 720/619, 689, 890, 691, 713
See application file for complete search history.

(56) References Cited

U.S. PATENT DOCUMENTS

| 5,878,011 | A  | * | 3/1999 | Nakamichi | ................... | 720/606 |
| 7,500,253 | B2 | * | 3/2009 | Inoue | ............................ | 720/620 |
| 7,937,718 | B2 | * | 5/2011 | Fujisawa et al. | .............. | 720/620 |

* cited by examiner

*Primary Examiner* — Huan Hoang
(74) *Attorney, Agent, or Firm* — Jianq Chyun IP Office

(57) ABSTRACT

An optical disc drive including an outer casing, a supporting base, a main shaft motor and a position-limiting element is provided. The outer casing has an optical disc entry. The supporting base is disposed in the outer casing. The main shaft motor is disposed on the supporting base. The position-limiting element has a first pivot portion, a position-limiting part and a second pivot portion located between the first pivot portion and the position-limiting part. The first pivot portion is connected to the supporting base, and the position-limiting element is able to be swung about the second pivot serving as a fulcrum. When the supporting base is located at an upper position, the position-limiting part is located at a first position, and when the supporting base is located at a lower position, the position-limiting part is located at a second position, wherein the first position is under the second position.

9 Claims, 5 Drawing Sheets

OPTICAL DISC DRIVE

CROSS-REFERENCE TO RELATED APPLICATION

This application claims the priority benefit of P.R.C. patent application serial no. 200910129833.7, filed on Mar. 26, 2009. The entirety of the above-mentioned patent application is hereby incorporated by reference herein and made a part of specification.

BACKGROUND OF THE INVENTION

1. Field of the Invention

The present invention relates to an optical disc drive. More particularly, the present invention relates to a slot-in optical disc drive.

2. Description of Related Art

With development of computer techniques, data to be processed by the computers is greatly increased. As the computers are further developed, data types that can be processed by the computer are increased, and a required storage capacity is also increased. Since the optical disc has advantages of low cost, portability, large storage capacity, easy preservation, long duration of preservation, and non-easiness of damage of data, it has replaced the conventional magnetic recording medium as one of the most indispensable optical storage medium in modern life. As the optical discs are widely used, optical disc drives used for reading data of the optical discs have become indispensable electronic products in daily life. If categorized by approaches of loading the optical disc into the optical disc drive, the commonly used optical disc drives are categorized into two types of a tray-type optical disc drive and a slot-in optical disc drive.

Regarding the slot-in optical disc drive, when a user inserts the optical disc into the optical disc drive, the user manually inserts the optical disc into the optical disc drive through an optical disc entry located at a side of the optical disc drive. During such a process, a surface of the optical disc can be damaged by touching internal elements of the optical disc drive due to an improper inserting angle of the optical disc. Therefore, some of the slot-in optical disc drives are equipped with a position-limiting element. When the optical disc is loaded into the optical disc drive, the position-limiting element can support the optical disc to maintain the optical disc at a certain height, so as to reduce a chance that the optical disc touches the other internal elements in the optical disc drive.

However, since the position-limiting element of the slot-in optical disc drive is generally fixed in the optical disc drive and has a certain height, when the optical disc is totally loaded in the optical disc drive and is rotated along a main shaft motor, a distance between the position-limiting element and the optical disc is rather close. If the optical disc is unstable or is oscillated during the rotation, it can impact the position-limiting element, and a surface of the optical disc can be damaged.

SUMMARY OF THE INVENTION

The present invention is directed to an optical disc drive, which can avoid damage of a surface of an optical disc caused by the optical disc rubbing internal elements of the optical disc drive when the optical disc is loaded, unloaded or rotated.

The present invention provides an optical disc drive including an outer casing, a supporting base, a main shaft motor and a position-limiting element. The outer casing has an optical disc entry. The supporting base is disposed in the outer casing. The main shaft motor is disposed on the supporting base. The position-limiting element has a first pivot portion, a position-limiting part and a second pivot portion located between the first pivot portion and the position-limiting part. The first pivot portion is connected to the supporting base, and the position-limiting element is able to be swung about the second pivot portion serving as a fulcrum. When the supporting base is located at an upper position, the position-limiting part is located at a first position, and when the supporting base is located at a lower position, the position-limiting part is located at a second position, wherein the first position is under the second position.

In an embodiment of the present invention, the position-limiting part has a supporting surface, and during a process when an optical disc is inserted into the outer casing through the optical disc entry, the optical disc leans against the supporting surface.

In an embodiment of the present invention, the position-limiting part has a guiding surface adjoined with the supporting surface.

In an embodiment of the present invention, the optical disc drive further includes an optical pick-up head disposed in the outer casing.

In an embodiment of the present invention, during a process when an optical disc is inserted into the outer casing through the optical disc entry, the position-limiting part is located at the second position, and the optical disc leans against the position-limiting part.

In an embodiment of the present invention, when an optical disc is disposed on the supporting base, the position-limiting part is located at the first position, and the optical disc is spaced from the position-limiting part.

In an embodiment of the present invention, when an optical disc is not loaded, the supporting base is located at the lower position.

In an embodiment of the present invention, the optical disc drive further includes a pivot portion fixing base disposed in the outer casing, and the second pivot portion is connected to the pivot portion fixing base.

In an embodiment of the present invention, the position-limiting part is located between the main shaft motor and the optical disc entry.

Accordingly, the optical disc drive of the present invention has the position-limiting part, and a position of the position-limiting part can be changed. When the optical disc is loaded into the outer casing, the position-limiting part is located at an upper position (for example, the second position), so as to support the optical disc during the process when the optical disc is inserted into the outer casing, and reduce a chance of damaging the surface of the optical disc caused by the optical disc touching the internal elements of the optical disc drive. After the optical disc is totally loaded into the outer casing, the position-limiting part is driven to a lower position (for example, the first position) by the supporting base, so as to reduce a chance that the optical disc impacts the position-limiting part during a rotation of the optical disc.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
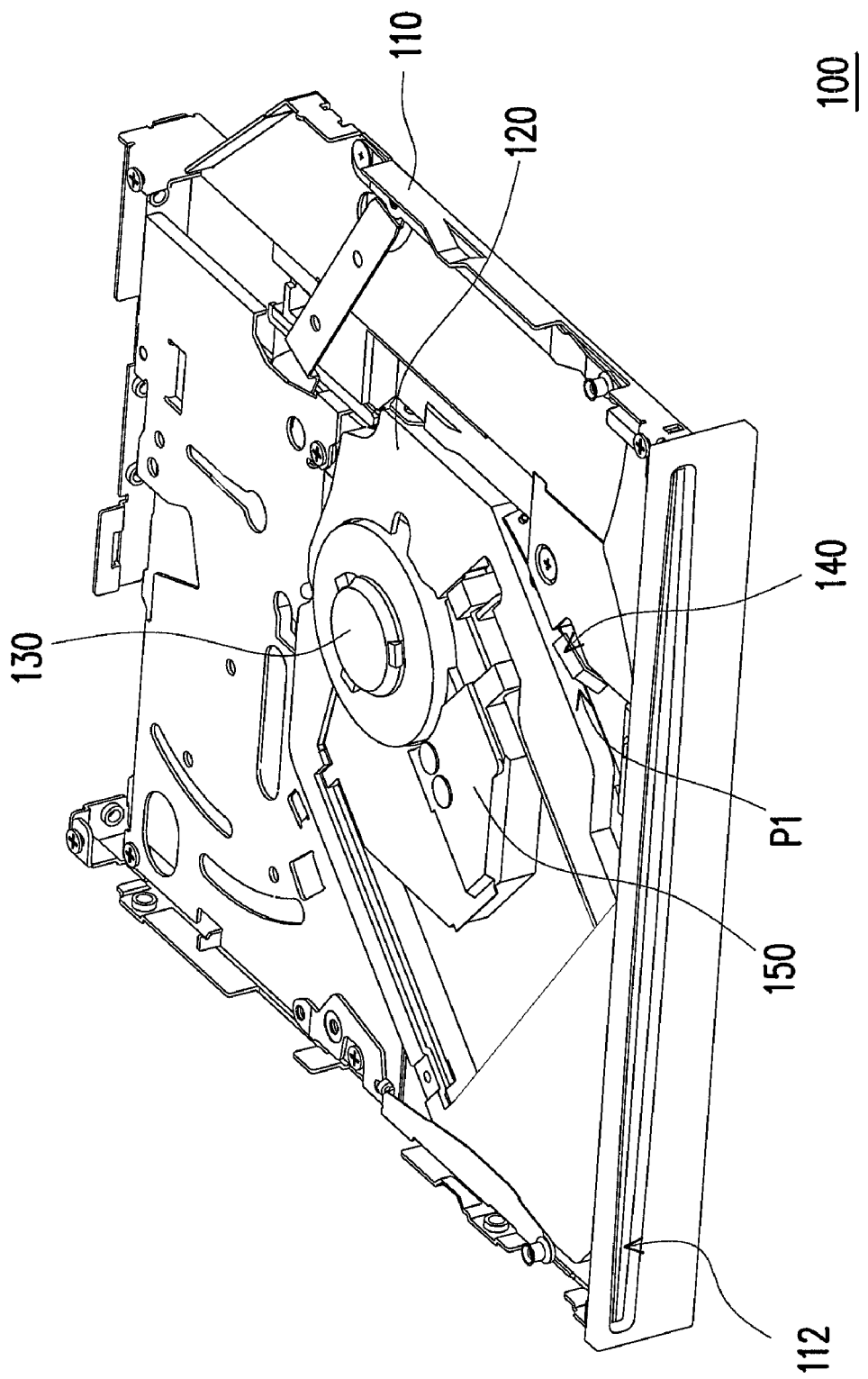
FIG. 1 is a three-dimensional view of an optical disc drive according to an embodiment of the present invention.
Figure 2:
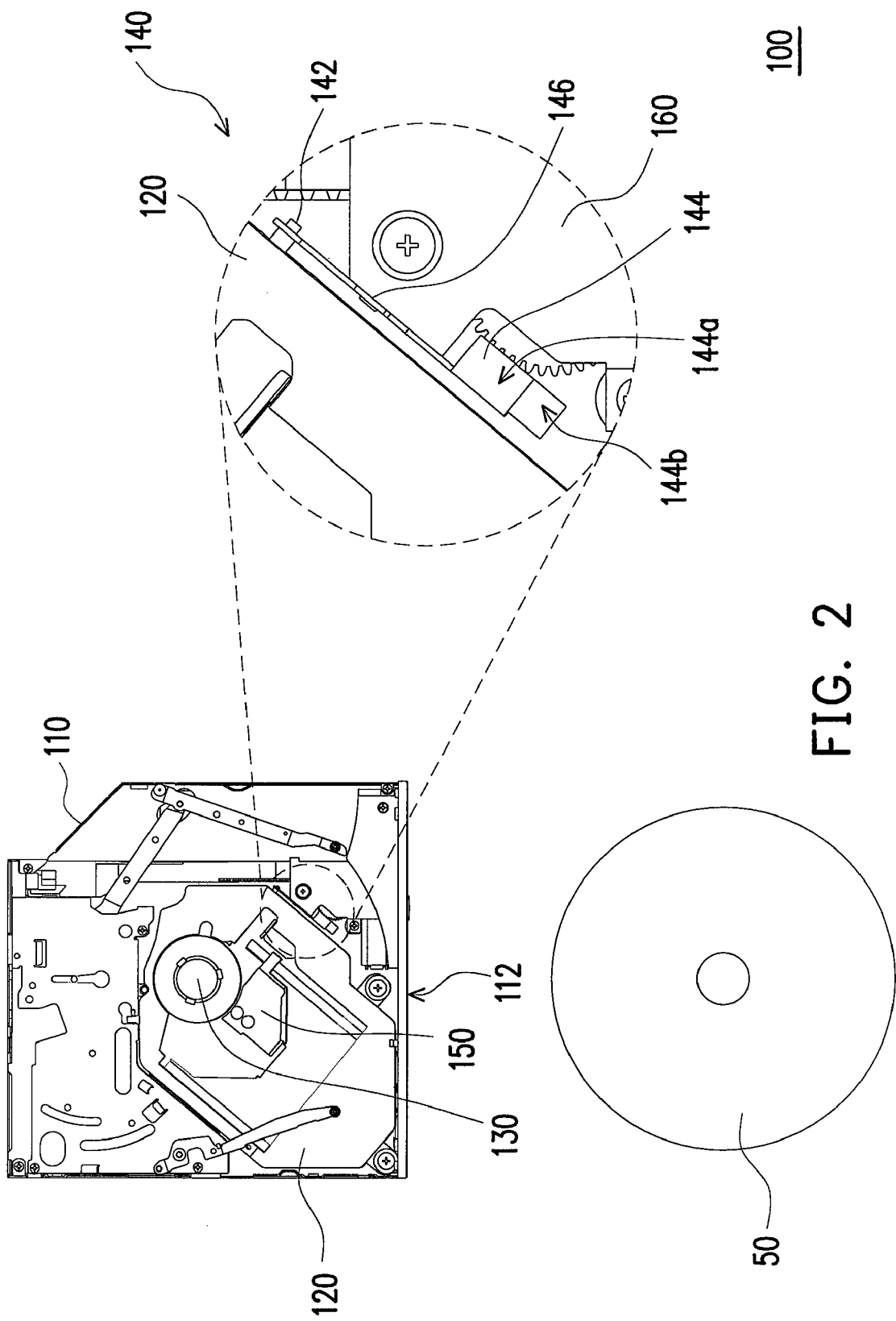
FIG. 2 is a top view of an optical disc drive of FIG. 1.
Figure 3:
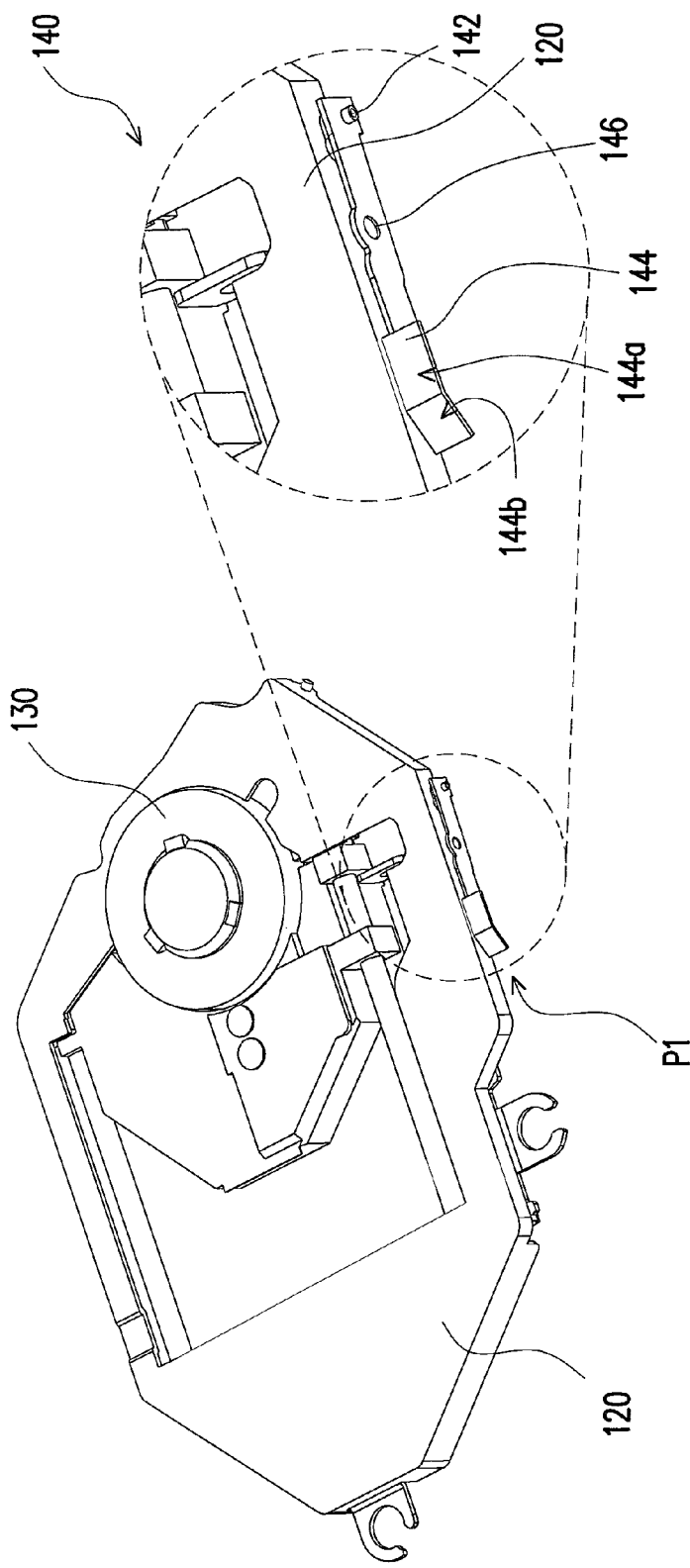
FIG. 3 is a partial three-dimensional view of an optical disc drive of FIG. 1.

FIG. 1 is a three-dimensional view of an optical disc drive according to an embodiment of the present invention. FIG. 2 is a top view of the optical disc drive of FIG. 1. FIG. 3 is a partial three-dimensional view of the optical disc drive of FIG. 1. Referring to FIG. 1, FIG. 2 and FIG. 3, the optical disc drive 100 includes an outer casing 110, a supporting base 120, a main shaft motor 130 and a position-limiting element 140. The outer casing 110 has an optical disc entry 112. The supporting base 120 is disposed in the outer casing 110. The main shaft motor 130 is disposed on the supporting base 120. The optical disc drive 100 is, for example, a slot-in optical disc drive, and an optical disc 50 (illustrated in FIG. 2) is suitable for being loaded into the outer casing 110 through the optical disc entry 112.

Referring to FIG. 2 and FIG. 3, the position-limiting element 140 has a first pivot portion 142, a position-limiting part 144 and a second pivot portion 146 located between the first pivot portion 142 and the position-limiting part 144. The first pivot portion 142 is rotatably connected to the supporting base 120, and the second pivot portion 146 is rotatably connected to a pivot portion fixing base 160, wherein the pivot portion fixing base 160 is fixed in the outer casing 110, and the position-limiting part 144 is located between the main shaft motor 130 and the optical disc entry 112. The first pivot portion 142 and the position-limiting part 144 of the position-limiting element 140 are able to be swung up and down and rotated about the second pivot portion 146 serving as a shaft. In the present embodiment, after the optical disc 50 is totally loaded in the outer casing 110, the supporting base 120 is driven from a lower position to an upper position, so that the main shaft motor 130 is moved upwards to support the optical disc 50. Moreover, the optical disc drive 100 further includes an optical pick-up head 150. The optical pick-up head 150 is located within the outer casing 110, and is used for reading data of the optical disc 50. The technique that the supporting base 120 is driven upwards or downwards to support or release the optical disc is a known technique in the art, and driving methods thereof are diversified. Since the driving method of the supporting base 120 is not an essence of the present invention, descriptions thereof are omitted herein.

Figure 4:
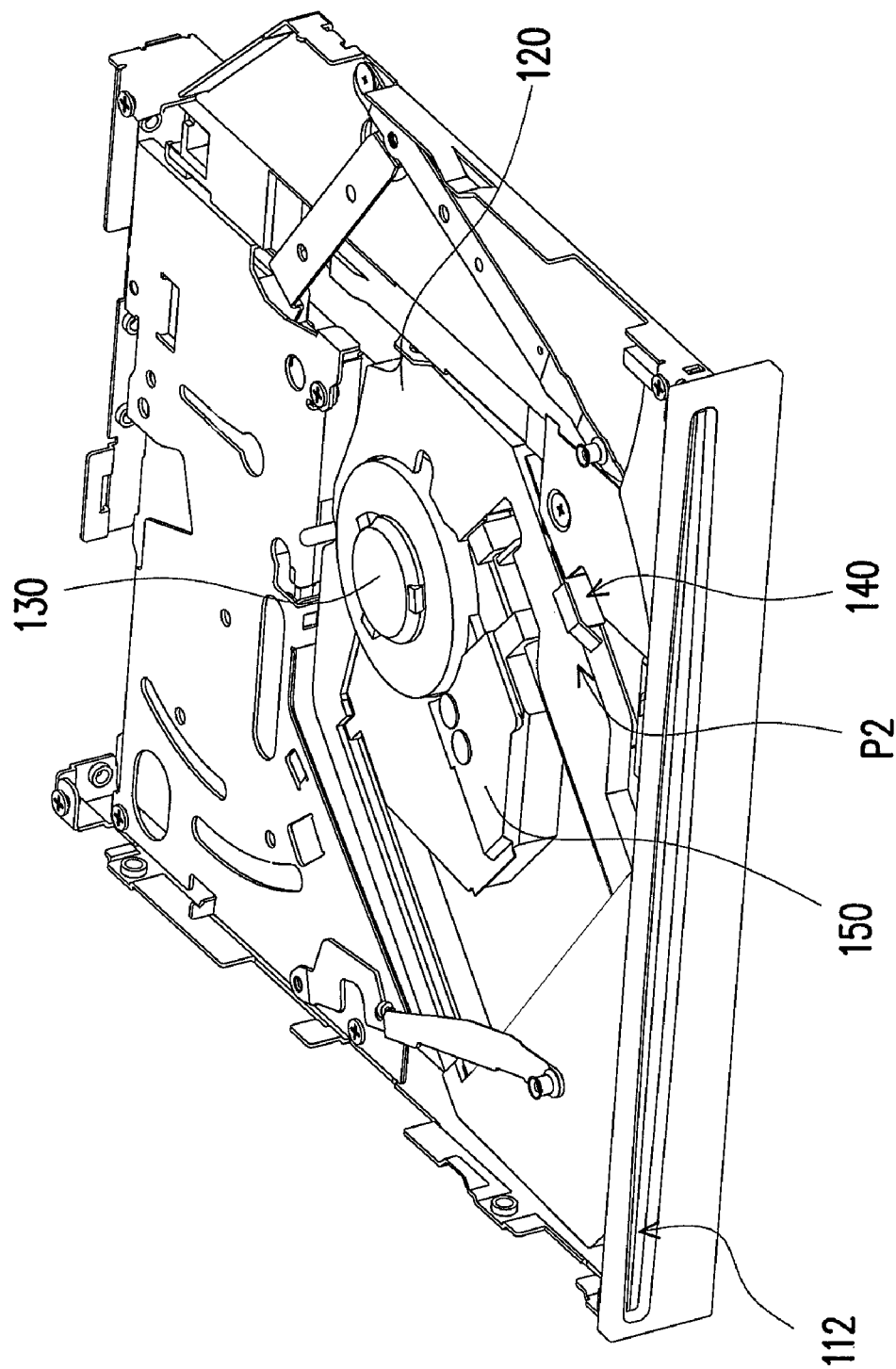
FIG. 4 is a three-dimensional diagram of an optical disc drive of FIG. 1 when a supporting base is located at a lower position.
Figure 5:
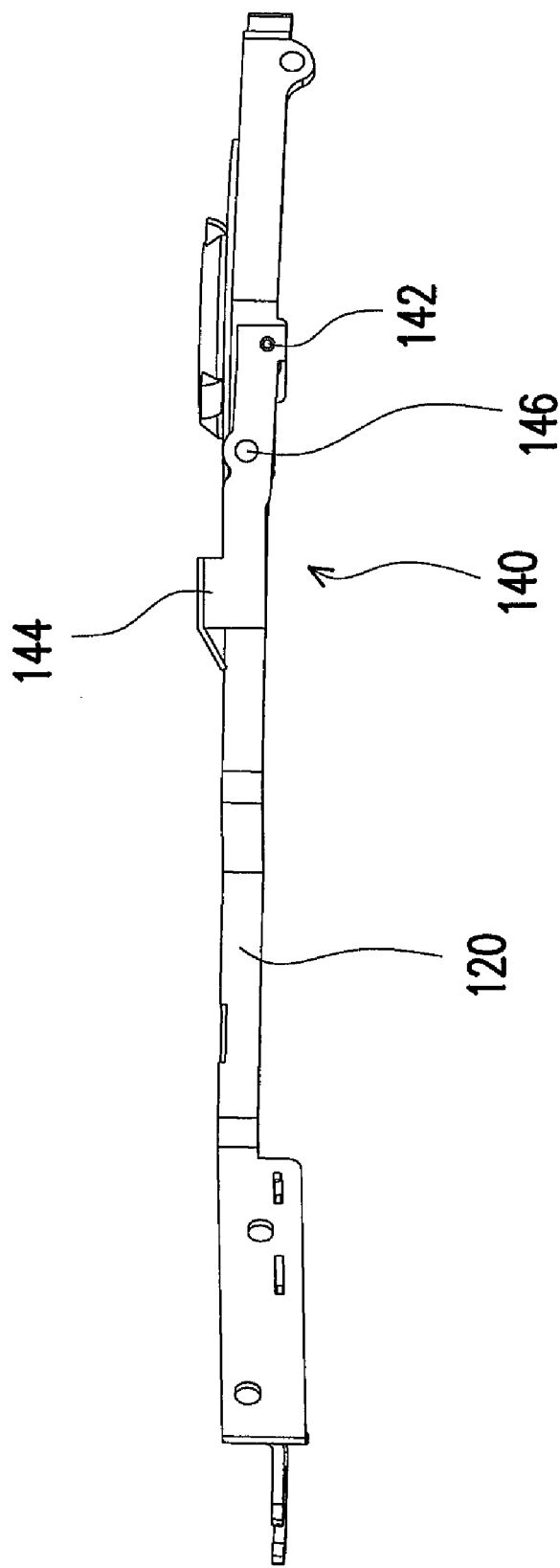
FIG. 5 is a partial side view of an optical disc drive of FIG. 4.

FIG. 4 is a three-dimensional diagram of the optical disc drive of FIG. 1 when the supporting base is located at the lower position. When the optical disc 50 is not loaded in the optical disc drive 100, the supporting base 120 is located at the lower position. Since the first pivot portion 142 of the position-limiting element 140 is connected to the supporting base 120, a position of the first pivot portion 142 is lower than a position of the position-limiting part 144, as shown in FIG. 5. FIG. 5 is a partial side view of the optical disc drive of FIG. 4. Now, the position-limiting part 144 is located at a second position P2. During a loading process of the optical disc 50, the position-limiting part 144 located at the second position P2 can support the optical disc 50, so that the optical disc 50 can be loaded in a certain height, so as to reduce a chance of damaging a surface of the optical disc 50 caused by the optical disc 50 touching internal elements of the optical disc drive 100.

After the disc 50 is totally loaded into the optical disc drive 100, the supporting base 120 is driven from the lower position to the upper position, so that the main shaft motor 130 is moved upwards to support the optical disc 50. When the supporting base 120 is moved to the upper position, the pivot portion 142 is also driven to be elevated relative to the outer casing 110, so that the position-limiting part 144 is descended from the second position P2 to a first position P1 along the second pivot portion 146 serving as a shaft, as shown in FIG. 1. It should be noticed that to clearly illustrate a movement of the position-limiting element 140, the optical disc 50 is not illustrated in FIG. 1, FIG. 4 and FIG. 5, and the supporting base 120 is located at the upper position in FIG. 1, and is located at the lower position in FIG. 4 and FIG. 5.

Conversely, when the optical disc 50 is about to be unloaded, the supporting base 120 is driven from the upper position to the lower position, so that the optical disc 50 is released from the supporting base 120, and meanwhile the first pivot portion 142 is also driven to be descended relative to the outer casing 110, so that the position-limiting part 144 is elevated from the first position P1 to the second position P2 along the second pivot portion 146 serving as a shaft, as shown in FIG. 4 and FIG. 5. Now, since the position-limiting part 144 is elevated to the second position P2, during an unloading process of the optical disc 50, the position-limiting part 144 located at the second position P2 can support the optical disc 50, so that the optical disc 50 can be unloaded in a certain height, so as to reduce a chance of damaging the surface of the optical disc 50 caused by the optical disc 50 touching the internal elements of the optical disc drive 100. After the optical disc 50 is totally unloaded, the position-limiting part 144 is maintain to the second position P2 for a next loading of the optical disc.

Therefore, during the loading or unloading process of the optical disc 50, the position-limiting part 144 is located at the second position P2, so as to support the optical disc 50 and reduce a chance of damaging the surface of the optical disc 50 caused by the optical disc 50 touching the internal elements of the optical disc drive 100. After the optical disc 50 is totally loaded into the outer casing 110, the position-limiting part 144 is descended from the second position P2 to the first position P1, so that the optical disc 50 is not too close to the position-limiting part 144, so as to reduce a chance that the optical disc 50 impacts the position-limiting part 144 during a rotation of the optical disc 50.

In detail, to smoothly load the optical disc 50 into the outer casing 110, when the user inserts the optical disc 50 into the outer casing 110 through the optical disc entry 112, the supporting base 120 and the main shaft motor 130 thereon are located at the lower position, so as to provide an entering space for the optical disc 50. After the optical disc 50 totally enters the outer casing 110, the supporting base 120 and the main shaft motor 130 thereon are driven to be elevated, so that the optical disc 50 can be supported by the main shaft motor 130. In the present invention, according to a characteristic that the supporting base 120 is driven to be elevated or descended, the second pivot portion 146 of the position-limiting element 140 is connected to the fixed pivot portion fixing base 160, and the first pivot portion 142 is connected to the supporting base 120, so that when the supporting base 120 is driven to be elevated or descended, the position-limiting element 140 can be swung about the second pivot portion 146 of the position-limiting element 140 serving as a fulcrum, and the position-limiting part 144 can be driven to be descended or elevated. FIG. 5 is a partial side view of the optical disc drive of FIG. 4. Referring to FIG. 5, since the second pivot portion 146 is located between the first pivot portion 142 and the position-limiting part 144, when the first pivot portion 142 is descended, the position-limiting part 144 is elevated, and vice versa.

Referring to FIG. 2 and FIG. 3, in the present embodiment, the position-limiting part 144 has a supporting surface 144*a*, and during the process when the optical disc 50 (shown in FIG. 2) is inserted into the outer casing 110 through the optical disc entry 112, the optical disc 50 can lean against the supporting surface 144*a*, so that the position-limiting part 144 can stably support the optical disc 50. Moreover, the position-limiting part 144 can further have a guiding surface 144*b* adjoined with the supporting surface 144*a*. The guiding surface 144*b* is used for guiding the optical disc 50 to slide along the guiding surface 144*b* to reach the supporting surface 144*a*, so that the process that the optical disc 50 is loaded into the outer casing 110 through the optical disc entry 112 can be smoother.

In summary, the optical disc drive of the present invention has the position-limiting part, and a position of the position-limiting part can be changed. When the optical disc is loaded into the outer casing, the position-limiting part is located at the upper position (for example, the second position P2 of the present embodiment), so as to support the optical disc during the process when the optical disc is inserted into the outer casing, and reduce a chance of damaging the surface of the optical disc caused by the optical disc touching the internal elements of the optical disc drive. After the optical disc is totally loaded into the outer casing, the position-limiting part is driven to the lower position (for example, the first position P1 of the present embodiment) by the supporting base, so as to reduce a chance that the optical disc impacts the position-limiting part during the rotation of the optical disc. Moreover, the position-limiting part can stably support the optical disc due to the supporting surface of the position-limiting part. In addition, base on a guiding effect of the guiding surface adjoined with the supporting surface, the optical disc can be smoothly loaded into the outer casing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive, comprising:
an outer casing, having an optical disc entry;
a supporting base, disposed in the outer casing;
a main shaft motor, disposed on the supporting base; and
a position-limiting element, having a first pivot portion, a position-limiting part and a second pivot portion located between the first pivot portion and the position-limiting part, the first pivot portion being connected to the supporting base, and the position-limiting element being able to be swung about the second pivot portion serving as a fulcrum,
wherein when the supporting base is located at an upper position, the position-limiting part is located at a first position, and when the supporting base is located at a lower position, the position-limiting part is located at a second position, wherein the first position is under the second position.

2. The optical disc drive as claimed in claim 1, wherein the position-limiting part has a supporting surface, and during a process when an optical disc is inserted into the outer casing through the optical disc entry, the optical disc leans against the supporting surface.

3. The optical disc drive as claimed in claim 2, wherein the position-limiting part has a guiding surface adjoined with the supporting surface.

4. The optical disc drive as claimed in claim 1, further comprising an optical pick-up head disposed in the outer casing.

5. The optical disc drive as claimed in claim 1, wherein during a process when an optical disc is inserted into the outer casing through the optical disc entry, the position-limiting part is located at the second position, and the optical disc leans against the position-limiting part.

6. The optical disc drive as claimed in claim 1, wherein when an optical disc is disposed on the supporting base, the position-limiting part is located at the first position, and the optical disc is spaced from the position-limiting part.

7. The optical disc drive as claimed in claim 1, wherein when an optical disc is not loaded, the supporting base is located at the lower position.

8. The optical disc drive as claimed in claim 1, further comprising a pivot portion fixing base disposed in the outer casing, and the second pivot portion being connected to the pivot portion fixing base.

9. The optical disc drive as claimed in claim 1, wherein the position-limiting part is located between the main shaft motor and the optical disc entry.

* * * * *